United States Patent [19]
Barton et al.

[11] Patent Number: 5,741,016
[45] Date of Patent: Apr. 21, 1998

[54] CHUCK

[75] Inventors: Christopher B. Barton; Stephen W. Steadings, both of Seneca, S.C.

[73] Assignee: Power Tool Holders Incorporated, Wilmington, Del.

[21] Appl. No.: 720,665

[22] Filed: Oct. 2, 1996

[51] Int. Cl.⁶ ............................................ B23B 31/12
[52] U.S. Cl. ........................ 279/62; 279/140; 279/902
[58] Field of Search ......................... 279/60–65, 140, 279/902

[56] References Cited

U.S. PATENT DOCUMENTS

| 573,189 | 12/1896 | Vogel . |
|---|---|---|
| 5,125,673 | 6/1992 | Huff et al. . |
| 5,172,923 | 12/1992 | Nakamura . |
| 5,234,223 | 8/1993 | Sakamaki . |
| 5,322,303 | 6/1994 | Nakamura . |
| 5,348,317 | 9/1994 | Steadings et al. . |
| 5,431,419 | 7/1995 | Mack . |
| 5,458,345 | 10/1995 | Amyot . |
| 5,499,829 | 3/1996 | Rohm . |
| 5,499,830 | 3/1996 | Schnizler . |

FOREIGN PATENT DOCUMENTS

| 0710518A2 | 5/1996 | European Pat. Off. . |
|---|---|---|
| 0710519A2 | 5/1996 | European Pat. Off. . |
| 0710520A2 | 5/1996 | European Pat. Off. . |
| 19506708 | 3/1996 | Germany . |
| 29600727U1 | 4/1996 | Germany . |
| 4438991A1 | 5/1996 | Germany . |
| 4365504 | 12/1992 | Japan . |

*Primary Examiner*—Steven C. Bishop
*Attorney, Agent, or Firm*—Dority & Manning

[57] ABSTRACT

Chuck for use with manual or powered driver having rotatable shaft, the chuck including a body member and jaws slidably positioned in angled passageways formed in the body. The chuck further includes a nut rotatably mounted relative to the body member and in engagement with threads on the jaws. A generally cylindrical sleeve member is disposed in driving engagement with the nut and overlying the nose section of the body so that when the sleeve member is rotated with respect to the body, the jaws will be moved thereby to grip the shank of a tool. A pawl member is biased to engage the sleeve member and is disposed selectively rotatably with respect to the body member. When the nut is tightened, the pawl member can be disposed to become nonrotatable with respect to the body member and restrains the nut from loosening during vibration of the chuck in use for its intended purpose.

10 Claims, 9 Drawing Sheets

CHUCK

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools used with such drivers, the tools may also comprise screwdrivers, nut drivers, burrs, mounted grinding stones and other cutting or abrading tools. Since the tools may have shanks of varying diameter or the cross-section of the tool shank may be polygonal, the device is usually provided with a chuck which is adjustable over a relatively wide range. The chuck may be attached to the driver by a threaded or tapered bore.

A wide variety of chucks have been developed in the art. In the simplest form of chuck, three jaws spaced circumferentially approximately 120 degrees apart from each other are constrained by angularly disposed passageways in a body attached onto the drive shaft and configured so that rotation of the body in one direction with respect to a constrained nut engaging the jaws, forces the jaws into gripping relationship with the cylindrical shank of a tool, while rotation in the opposite direction releases the gripping relationship. Such a chuck may be keyless if it can be tightened and loosened by manual rotation. One example of such a chuck is disclosed in U.S. Pat. No. 5,125,673, commonly assigned to the present assignee and entitled "Non-Impact Keyless Chuck," and whose entire disclosure is incorporated herein by this reference.

Despite the success of keyless chucks such as set forth in U.S. Pat. No. 5,125,673, varying configurations of keyless chucks are desirable for a variety of applications. In a conventional chuck used to secure a drill engaged in hammer drilling for example, the vibration that results from use of the tool, can cause the jaws to loosen their grip around the shaft of the tool. This can have undesirable consequences, both for the work piece and for the operation of the tool.

SUMMARY OF THE INVENTION

The present invention recognizes and addresses the foregoing considerations. Accordingly, it is an object of the present invention to provide an improved chuck wherein vibration during use does not cause the jaws to loosen their grip around the shaft of the tool.

It is also an object of the present invention to provide an improved keyless chuck.

It is another object of the present invention to provide a keyless chuck that allows for efficient tightening of the nut on the jaws during operation.

It is another object of the present invention to provide a keyless chuck that has a minimum number of individual components that must be assembled.

These and other objects are achieved by providing a chuck for use with a manual or power driver having a rotatable drive shaft, the chuck comprising a generally cylindrical body member having a nose section and a tail section. The tail section has an axial bore formed therein to mate with the drive shaft of the driver, and the nose section has an axial bore formed therein and a plurality of angularly disposed passageways formed therethrough and intersecting the axial bore. The chuck further includes a plurality of jaws slidably positioned in each of the angularly disposed passageways, each of the jaws having a jaw face formed on one side thereof and threads formed on the opposite side thereof. The chuck also includes a nut rotatably mounted with respect to the body member and in engagement with the threads on the jaws. The chuck also includes a generally cylindrical sleeve member in driving engagement with the nut and overlying the nose section of the body member whereby when the sleeve member is rotated with respect to the body member, the jaws will be moved thereby.

The chuck includes a nut retainer member that is configured and disposed so as to cooperate with the front cylindrical portion of the body member in a manner that retains the nut from moving axially toward the nose section of the body member. The nut retainer has a lower section that is attached to the front cylindrical portion of body member. The exterior surface of the nut retainer member includes an engagement portion that is shaped cylindrically and is disposed so that the nut retainer retains the nut from moving axially toward the nose section of the body member. In some embodiments, the exterior surface of the engagement portion of the nut retainer member includes a ratchet wheel portion that is shaped cylindrically and has teeth to provide a knurled or ridged surface. In other embodiments, the exterior surface of the engagement portion of the nut retainer member includes a friction wheel portion that is shaped cylindrically with an unknurled or unridged surface.

The chuck further includes a pawl member disposed selectively rotatably with respect to the sleeve member and with respect to the body member. The pawl member can be provided with a resilient detent section, and the sleeve member can engage the detent section of the pawl member via at least one locking boss configured in an inner surface of the sleeve member. The pawl member can have at least one resilient arm biased toward the sleeve member, and this arm can have at least one engagement section configured and disposed adjacent the engagement portion of the nut retainer. The engagement section of the pawl member and the engagement portion of the nut retainer can be selectively disposed to cooperate to render the nut and the sleeve member nonrotatable with respect to the body member. When so disposed, a restraining torque acts to prevent relative rotation between the pawl member and the sleeve (and the nut operatively connected to the sleeve) and a restraining torque acts to prevent relative rotation between the pawl member and the body member. The operator must apply a predetermined releasing torque between the sleeve (and the nut driven by the sleeve) and the body member in order to permit the nut to rotate with respect to the body member. By applying the releasing torque to the sleeve, the operator disengages the pawl member so as to allow the sleeve to rotate the nut relative to the body member.

In some embodiments, a pawl holder permits the sleeve and the nut to be selectively rotated relative to one another over a limited arc. While in other embodiments, the pawl member and the nut are fixed to one another so that they always rotate in unison. In some of the latter embodiments, the pawl holder is carried by the nut or is defined in the nut.

The body member of the chuck can include a thrust receiving portion. The body member can be rotatably disposed with respect to the nut by means of a bearing assembly disposed between the nut and the body member. Alternatively, a friction-reducing surface formed as a coating disposed on at least one of the body member and the nut may be utilized. Further, the chuck can include a self-contained anti-friction bearing assembly disposed adjacent the thrust receiving portion.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
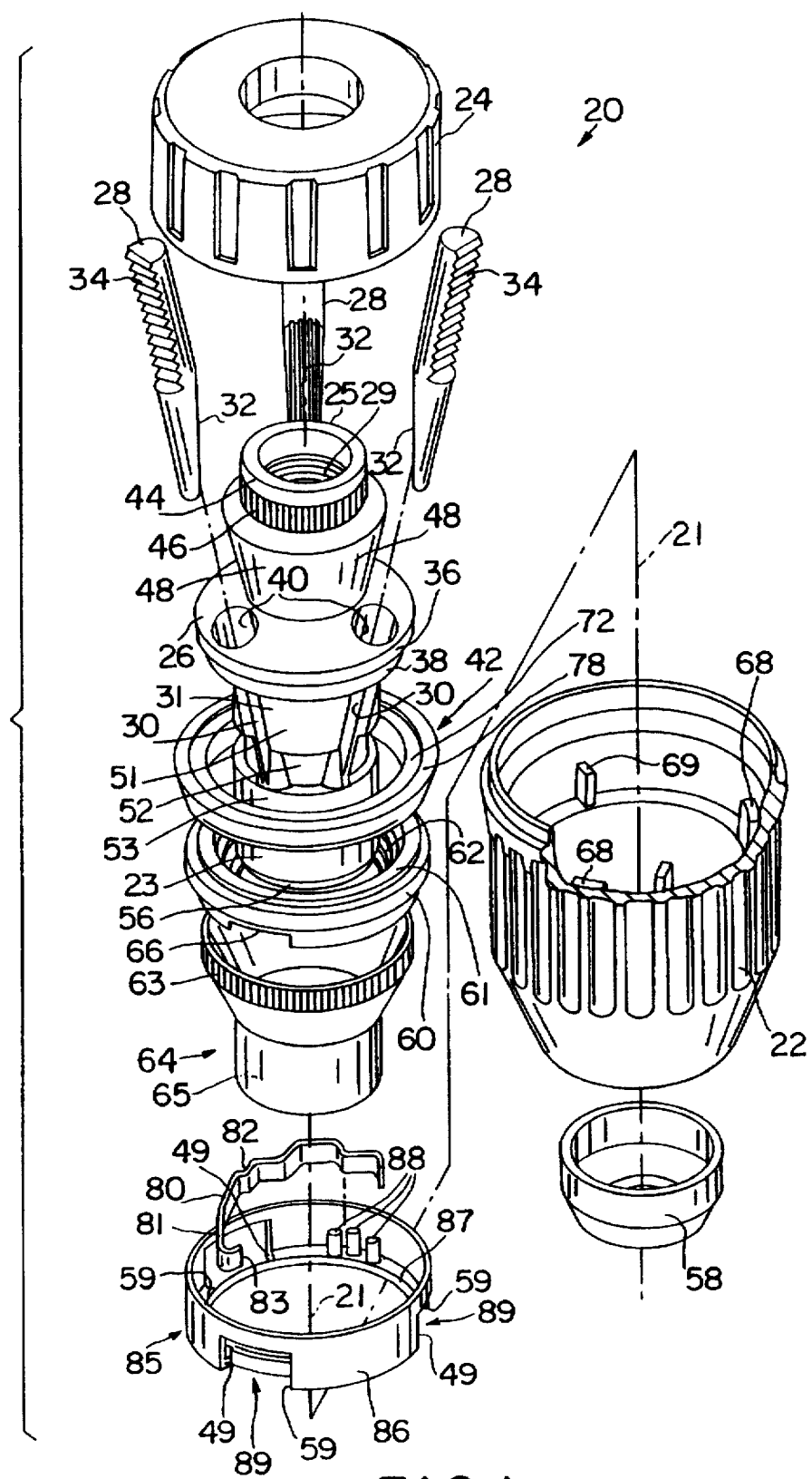
FIG. 1 is an elevated perspective assembly view of a chuck in accordance with a preferred embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Figure 2:
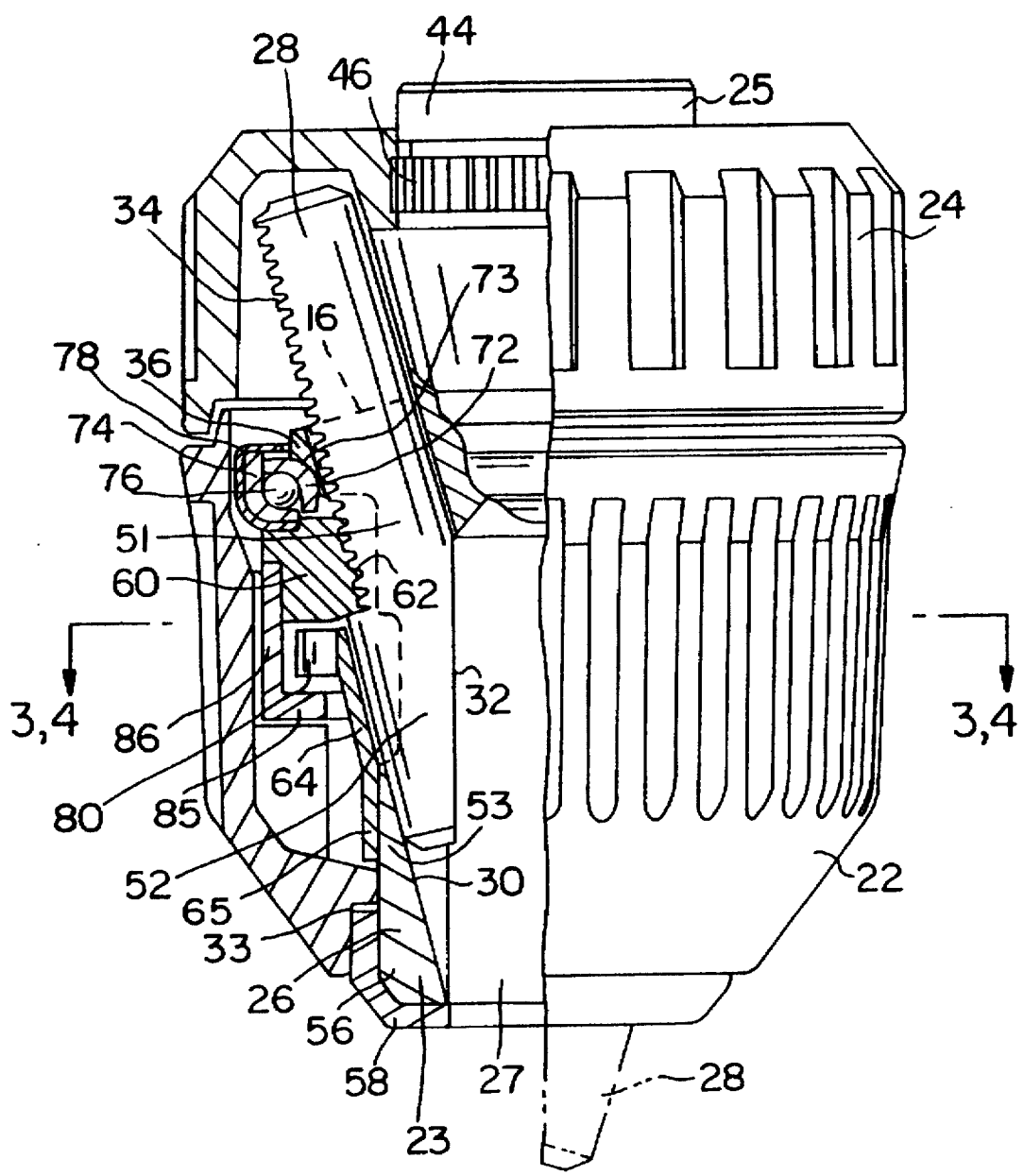
FIG. 2 is a front plan view, partly in section, of the embodiment of the chuck shown in FIGS. 1, 3 and 4.

Referring to FIG. 1, a chuck 20 in accordance with the present invention is illustrated having a central longitudinal axis depicted by the dashed line designated by the numeral 21. Chuck 20 includes a sleeve member 22, an optional rear sleeve member 24, a body member 26, and a plurality of jaws 28. In FIG. 2, the outline of the portion of the part of body member 26 that is behind jaw 28 is shown in phantom by the dashed outline. The portion of jaw 28 extending out ahead of body member 26 is also shown in FIG. 2 in phantom by the dashed outline.

Referring to FIGS. 1 and 2, body member 26 is generally cylindrical in shape and comprises a nose or forward section 23 and a tail or rearward section 25. As shown in FIG. 2, an axial bore 27 is formed in the nose section 23 of body member 26. Axial bore 27 is somewhat larger than the largest tool shank that the chuck is designed to accommodate. As shown in FIG. 1, a threaded bore 29 is formed in tail section 25 of body 26 and is of a standard size to mate with the drive shaft of a powered or hand driver (not shown). While a threaded bore 29 is illustrated, such bore could be replaced with a tapered bore of a standard size to mate with a tapered drive shaft. The bores 27, 29 may communicate at the central region 31 (FIG. 1) of body member 26.

As shown in FIGS. 1 and 2, a separate passageway 30 is formed in body member 26 to accommodate each jaw 28. A plurality of jaws 28 and corresponding passageways are provided. Referring to FIG. 1, when three jaws 28 are employed, each jaw 28 is separated from the adjacent jaw by an arc of approximately 120 degrees. The longitudinal axes of the passageways 30 and the jaws 28 are angled with respect to the longitudinal axis 21 of the chuck but intersect the chuck axis at a common point ahead of the chuck body 26. As shown in FIGS. 1 and 2, each jaw 28 has a tool engaging face 32, which is generally parallel to the longitudinal axis of the chuck body 26. In addition, each jaw 28 has threads 34 on its outer surface, which is disposed opposite to the tool engaging face 32. Threads 34 of any suitable type and pitch may be utilized within the scope of the present invention as would be readily apparent to one skilled in the art.

As illustrated in FIGS. 1 and 2, body member 26 includes a thrust ring member 36, which in a preferred embodiment forms an integral part of body member 26 and constitutes the thrust-receiving portion 36 of body member 26. Although not presently preferred, thrust ring member 36 may be a separate component from the body member. As shown in FIG. 1, thrust ring member 36 includes a ledge portion 38, which can be adapted for engagement with the shroud or outer race of a self-contained anti-friction bearing assembly 42 as will be described in more detail below. Thrust ring member 36 includes a plurality of jaw guideways 40. Each jaw guideway 40 is formed around the thrust ring portion 36 in alignment with a corresponding passageway 30 to permit movement (retraction and extension) of the corresponding jaw 28 through guideway 40.

Referring to FIGS. 1 and 2, tail section 25 of body member 26 can include a rear cylindrical portion 44 with a knurled surface 46 thereon for receipt of optional rear sleeve 24 to be pressed thereon if so desired. As shown in FIG. 1, body 26 further includes a first tapered portion 48 extending from rear cylindrical portion 44 to the region of thrust ring 36. A first central cylindrical portion 51 extends from the region of thrust ring 36 to a second central cylindrical portion 52 having a diameter less than first central cylindrical portion 51.

As shown in FIGS. 1 and 2, a front cylindrical portion 53 extends from one end of second central cylindrical portion 52 to a beveled nose portion 56 that is adapted to receive a nosepiece 58 for maintaining the sleeve 22 in driving engagement with a nut, as will be explained in more detail below. Alternatively, a snap ring or the like could be utilized to maintain the sleeve 22 in place or the sleeve 22 could be pressed on or otherwise secured to the nut (described below).

The chuck of the present invention further includes a nut that is rotatably mounted with respect to the body member and in engagement with the threads on the jaws. In a preferred embodiment, the nut is configured in the form of a one piece nut, but could be formed in two or more pieces that could be joined together or merely concentrically disposed. As shown in FIGS. 1 and 2, a nut 60 includes threads 62 for mating with threads 34 on jaws 28 whereby when nut 60 is rotated with respect to body 26, the jaws 28 will be advanced or retracted in a particular direction along the longitudinal axis of the passageways 30. This direction has a component along the longitudinal axis of the body member 26.

Figure 3:
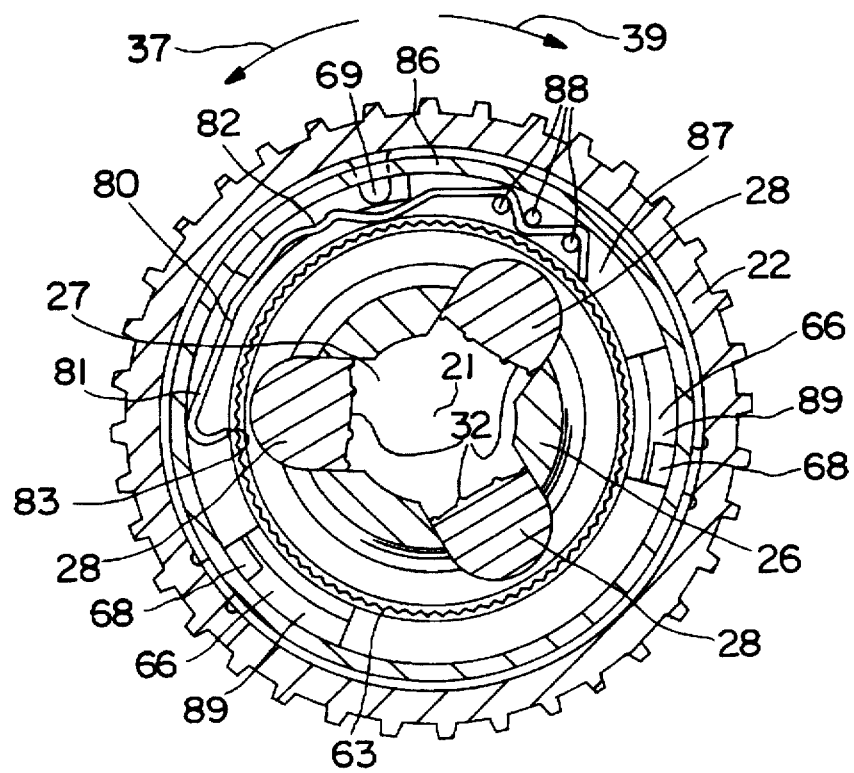
FIG. 3 is a cross-sectional view taken in the direction of arrows labelled 3—3 in FIG. 2 with the chuck in an opening or closing operative orientation.
Figure 4:
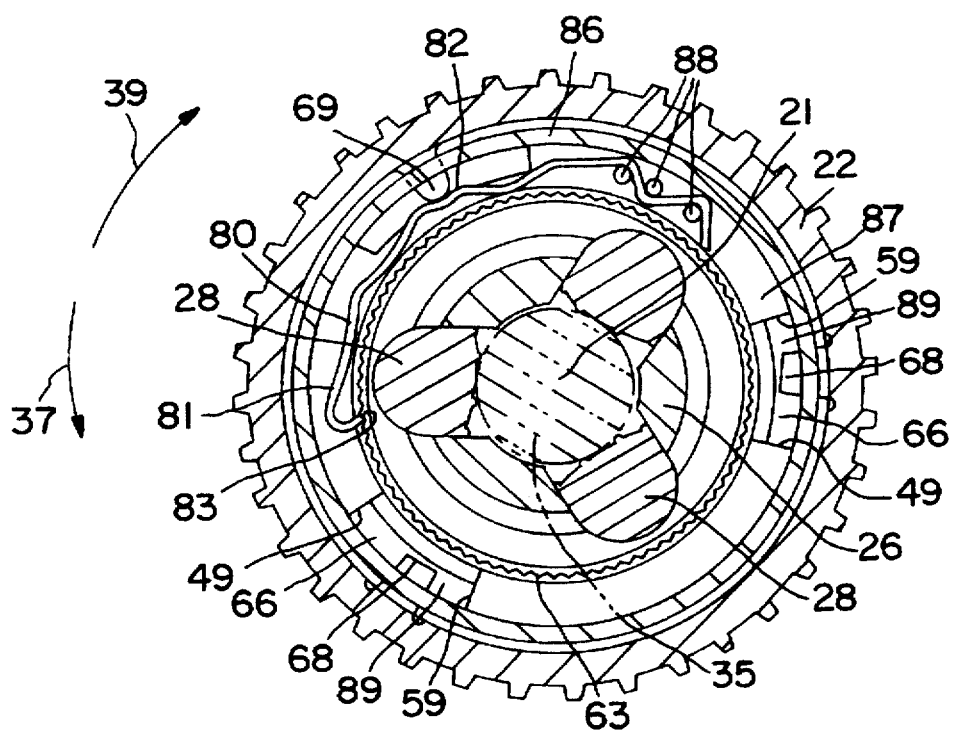
FIG. 4 is a cross-sectional view taken in the direction of arrows labelled 4—4 in FIG. 2 with the chuck in a locked operative orientation.

In the chuck of the present invention, the nut and the sleeve are configured and disposed so that rotation of one about the longitudinal axis of the chuck results in rotation of the other about the same axis. As shown in FIGS. 1, 3 and 4, nut 60 may include drive slots 66 (only one visible in FIG. 1) for mating with drive ribs 68 on sleeve 22. In this way nut 60 is keyed to sleeve 22 so that when sleeve 22 is rotated, nut 60 will rotate therewith and move jaws 28 as set forth above.

The chuck of the present invention can include a nut retainer member that is configured and disposed so as to cooperate with the front cylindrical portion of the body member in a manner that retains the nut from moving axially toward the nose section of the body member. The exterior surface of the nut retainer member includes an engagement portion that is shaped cylindrically and is disposed so that the nut retainer retains the nut from moving axially beyond a particular point toward the nose section of the body member. As shown in FIG. 1, a nut retainer is generally designated by the numeral 64 and is configured with three distinctly shaped exterior surfaces and two distinctly shaped interior surfaces. As shown in FIGS. 1 and 2, nut retainer 64 has a lower section 65 that has a cylindrically shaped interior surface and a cylindrically shaped exterior surface that is concentric with respect to the interior surface. As shown in FIG. 2, the interior surface of lower section 65 of nut retainer member 64 is attached to front cylindrical portion 53 of body member 26. Preferably, lower section 65 of nut retainer member 64 is press-fitted to front cylindrical portion 53, but also could be attached by other conventional means such as a snap-fit for example. Joined to the interior surface of lower section 65 is a second interior surface shaped in a truncated conical form.

As shown in FIG. 1, the exterior surface of nut retainer member 64 includes an engagement portion in the form of a ratchet wheel portion 63 that is shaped with a cylindrical surface that is provided with a plurality of teeth to form a surface that is knurled or ridged. The exterior surface of nut retainer member 64 also includes a truncated conical surface disposed intermediate the engagement portion 63 and lower section 65. As shown in FIG. 2, ratchet wheel portion 63 is disposed so that nut retainer 64 retains nut 60 from moving axially beyond ratchet wheel portion 63 toward nose section 23 of body member 26.

In further accordance with the chuck of the present invention, a pawl member is provided. The pawl member is configured and disposed such that when the jaws of the chuck are desirably gripping the shank of the tool, the pawl member becomes constrained against rotation with respect to both the nut and the body member, and a predetermined releasing torque must be applied by the operator before the nut can rotate with respect to the body member. As shown in FIGS. 1–4, a pawl member 80 is configured and disposed about body member 26. As shown in FIGS. 2–4, pawl member 80 is disposed adjacent the engagement portion formed by ratchet wheel portion 63 of nut retainer member 64. As shown in FIGS. 1, 3 and 4, pawl member 80 is configured with at least one resilient arm 81 that is biased toward sleeve member 22 in a radial direction relative to axial bore 27 formed in body member 26 and axis 21 of chuck 20.

As shown in FIGS. 1, 3 and 4, at least one locking boss 69 is carried by sleeve member 22. In addition, pawl member 80 has at least one detent section 82 that is configured as shown in FIG. 4 to engage locking boss 69 in a manner whereby pawl member 80 is moved radially away from sleeve member 22 and disposed so as to become nonrotatable with respect to body member 26 and sleeve member 22. This nonrotatable state is shown in FIG. 4 and persists until a predetermined releasing torque is applied by the operator between sleeve member 22 and body member 26.

As shown in FIGS. 1, 3 and 4 for example, pawl member 80 includes at least one engagement section 83 that is configured and disposed to become selectively engaged with the teeth forming the knurled or ridged surface of ratchet wheel portion 63. As shown in FIG. 4, locking boss 69 deflects arm 81 resiliently radially (in a general sense) inwardly toward the central axis 21 of chuck 20 and forces engagement section 83 between adjacent ones of the ridges or teeth formed on ratchet wheel portion 63. Upon engagement with ratchet wheel portion 63, pawl member 80 and sleeve member 22 become constrained against rotation with respect to body member 26. In this way, the engagement between pawl member 80 and ratchet wheel portion 63 provides a restraining torque. So long as this engagement does not slip, i.e., the restraining torque is not overcome, then sleeve member 22, nut 60 and pawl member 80 become nonrotatable relative to one another and relative to body member 26. Thus, pawl member 80, locking boss 69 and ratchet wheel portion 63 are configured so that a circumferentially directed force (torque) is needed to overcome the engagement between ratchet wheel portion 63 and engagement section 83 and between detent section 82 and locking boss 69.

The operator can overcome the restraining torque by the application of a predetermined releasing torque. Referring to FIG. 4 and assuming that body member 26 remains fixed, the operator applies the releasing torque to sleeve member 22 in the direction indicated by the arrow designated by the numeral 39, which is the direction for opening the chuck 20 so as to release the chuck's grip on the shank (designated by the numeral 35 and shown in phantom cross-section in FIG. 4 by the dashed lines) of a tool held by the chuck. The releasing torque applied by the operator must overcome the mechanical and frictional engagement between detent section 82 and locking boss 69. Conversely, any torque that is applied to sleeve member 22 in the direction for closing the chuck, i.e., the direction indicated by arrow 37, must overcome the combined mechanical and frictional engagement between engagement section 83 and ratchet wheel portion 63.

Referring to FIG. 2, as nut 60 is rotated so that jaws 28 are increasing the forward gripping force applied to the shank of a tool, a corresponding axial force is increasingly exerted rearwardly through jaws 28 to nut 60. This rearward axial force is transmitted through nut 60 to body member 26, and particularly to ledge 38 of thrust ring 36 of body member 26.

In further accordance with the present invention, a means is provided for rendering the pawl member nonrotatable with respect to the nut. As embodied herein, the chuck can include a pawl holder. The pawl holder is configured to hold and carry the pawl member so that the pawl member as a whole does not rotate or move circumferentially with respect to the pawl holder. Thus, the pawl holder and the pawl member rotate together in unison. Moreover, the pawl holder has at least one travel slot that is configured to limit relative rotational movement between the sleeve member and the pawl holder. In so doing, the travel slot limits relative rotational movement between the sleeve member and the pawl member.

In the embodiment of FIGS. 1–4, a pawl holder 85 is defined by a cylindrical ring 86. As shown in FIG. 2, ring 86 is press fitted to nut 60 so that pawl holder 85 and nut 60 cannot rotate relative to one another. As shown in FIG. 1, a flange 87 extends radially from one edge of ring 86 of pawl holder 85. As shown in FIGS. 1, 3 and 4, three upright staggered pegs 88 are formed to extend axially from the inside surface of flange 87. As shown in FIGS. 3 and 4, a portion of pawl member 80 is wedged and intertwined between the three pegs 88 formed in pawl holder 85. Thus, pegs 88 hold pawl member 80 fixed with respect to pawl holder 85. In this way, nut 60 and pawl member 80 cannot rotate with respect to one another and thus must rotate in unison. However, other constructions can be used to render the pawl member nonrotatable relative to the nut. For example, the pawl member can be attached directly to the nut or in a different manner, such as by welding, to the pawl holder.

At least one travel slot can be provided in the pawl holder or in the nut in order to limit relative rotational movement between the sleeve member and the pawl holder, whether the pawl holder is a separate component from the nut or is unitary with the nut. As shown in FIGS. 1, 3 and 4, at least one travel slot 89 is formed in pawl holder 85. Each travel slot 89 of pawl holder 85 can be configured to conform to the placement and shape of a corresponding drive slot 66 of nut 60 when nut 60 and pawl holder are fitted together. As shown in FIG. 1, each travel slot 89 is defined by a forward stop wall 49 and a rearward stop wall 59, which are configured to coincide with the respective side walls of the corresponding drive slot 66 formed in nut 60. As shown in FIGS. 3 and 4, each travel slot 89 is configured to receive a corresponding drive rib 68 of sleeve member 22 and permit relative movement between sleeve member 22 and pawl holder 85 (and nut 60) corresponding to movement of the drive rib 68 within the travel slot 89 between the rearward wall 59 and the forward wall 49. However, when drive rib 68 butts against rearward wall 59 or forward wall 49 of travel slot 89, drive rib 68 also butts against one of the opposed side walls of drive slot 66 of nut 60, resulting in direct drive of nut 60 and pawl member 80 by sleeve member 22.

In a conventional chuck used to secure a drill engaged in hammer drilling for example, the vibration that results from use of the tool, produces a release torque on the sleeve member in the direction of least resistance. Also, mere vibration can cause friction that exists between the inclined mating surfaces of the jaw threads 34 and nut threads 62 to relax and move in the direction of least resistance, and the sleeve 22 connected to nut 60 moves in the same direction. Accordingly, because the sleeve is configured to drive rotation of the nut, this release torque tends to cause the jaws 28 to loosen (i.e., release) their grip around the shank 35 (shown in phantom in FIG. 4) of the tool. However, in accordance with the chuck of the present invention, the tension in the resilient pawl member 80 and the configuration of locking boss 69 and detent section 82 in relation to the ridges and teeth forming the exterior surface of ratchet wheel portion 63, can be controlled to produce a restraining torque that counteracts such release torque and/or prevents loosening of the sleeve due to relaxation of the frictional engagement between the threads 34 of jaws 28 and the threads 62 of nut 60. Thus, before sleeve 22 can rotate with respect to pawl member 80 (and with respect to body member 26 secured to pawl member 80 by the aforementioned engagement with ratchet wheel portion 63), the magnitude of the release torque caused by vibrations acting on nut 60 and sleeve member 22 must exceed the restraining torque that prevents pawl member 80 from rotating relative to sleeve member 22. The desired magnitude of this restraining torque is such as to prevent such vibrations from causing sleeve member 22 (and nut 60 keyed thereto by the interaction of drive slots 66 and drive ribs 68) to rotate relative to body member 26. This ensures that jaws 28 do not loosen their desired grip around the tool shank during such vibration of the tool when in use for its intended purpose such as hammer drilling or any other application that involves vibrations. Upon the operator applying to the sleeve member 22 a releasing torque that exceeds the restraining torque, then the sleeve member 22 and the nut 60 keyed thereto will be selectively rendered rotatable with respect to the body member 26. This results because the sleeve's locking boss 69 disengages pawl member 80 and so causes pawl member 80 to disengage from ratchet wheel portion 63 of nut retainer member 64.

Referring to FIGS. 3 and 4, when the operator rotates sleeve 22 with respect to body member 26 in the direction of the arrow designated 37 and nut 60 is rotating in unison with sleeve 22, then jaws 28 are tightening, i.e., closing, onto the shank of a tool placed in axial bore 27. When the operator rotates sleeve 22 with respect to body member 26 in the direction of the arrow designated 39 in FIGS. 3 and 4, jaws 28 are being untightened, i.e., opening, from the shank of a tool placed in axial bore 27. FIG. 3 shows one of the chuck's operating conditions in which drive ribs 68 butt against one of the side walls of drive slots 66, and rotation of sleeve 22 in the direction of arrow 39 directly drives nut 60 in the opening direction that separates the tool engaging faces 32 of jaws 28. When the chuck is in this opening state, locking boss 69 does not engage pawl member 80, which is biased radially outwardly toward sleeve 22.

FIG. 4 illustrates one of the chuck's operating conditions in which the jaws 28 of the chuck are locked onto shank 35 of a tool so as to counteract loosening of the chuck's grip due to torque and vibrational effects. In this closed state, locking boss 69 engages detent section 82 of pawl member 80 so as to force engagement section 83 against the teeth of ratchet wheel portion 63 of retainer member 64. Further rotation of sleeve 22 in the direction of arrow 37 will cause further tightening of the chuck as radially outward movement of resilient arm 81 permits engagement section 83 to ride over the teeth/ridges of ratchet wheel portion 63 of nut retainer member 64. Once drive ribs 68 butt against rearward stop walls 59 (corresponding to one of the side walls of drive slots 66 of nut 60) of travel slots 89 of pawl holder 85, further rotation of sleeve 22 causes direct rotation of pawl holder 85 and nut 60 so as to further tighten the jaws 28 of the chuck about the shank of the tool.

As noted above, the nut is rotatably disposed with respect to the body member. This is desirably accomplished by means of a bearing assembly disposed between the nut and the body member. Because the pawl member is fixed to rotate in unison with the nut, the bearing assembly disposed between the nut and the body member also causes the pawl member to become rotatably disposed with respect to the body member.

In one alternative embodiment, the bearing assembly includes a surface bearing disposed between one surface of the nut and one surface of the body member. As shown in FIG. 1, a forwardly disposed surface formed by ledge 38 of thrust ring of body member 26 is disposed to face a rearwardly facing surface 61 of nut 60. In the view shown in FIG. 1, the rearwardly facing surface 61 of nut 60 is one of the surfaces that would be disposed to bear against the forwardly facing surface, i.e., ledge 38, of body member 26 in this surface bearing embodiment.

Desirably, at least one friction-reducing composition would be disposed between the opposed surfaces of nut 60 and body member 26 disposed in this surface bearing relationship. The at least one friction-reducing composition can be deployed as a coating or layer of solid film lubricant that is applied by being sprayed on one of the bearing surfaces of nut 60 and body member 26 and then cured thereon. Such lubricant film also can be applied the mating surfaces between the threads 62 of the nut 60 and the threads 34 of the jaws 28. In an alternative embodiment, the components with the surfaces may be dipped or spray tumbled.

A composition believed to be suitable for the friction-reducing composition is the PERMA-SLIK® lubricant distributed by E/M Corporation of West Lafayette, Ind. The PERMA-SLIK® lubricant can be applied to each desired surface according to the instructions provided by the manufacturer. Applicants believe that a preferred cured film thickness for each such layer of the solid film lubricant is between 0.0001 and 0.0005 inches. Further details concerning solid film lubricants can be learned from commonly assigned co-pending application Ser. No. 08/472,253, which is hereby incorporated herein by reference.

As shown in FIG. 1, rearwardly facing surface 61 of nut 60 would be provided with such substantial friction-reducing coating, either solely or in addition to forwardly disposed surface, i.e., ledge 38, of thrust ring member 36 of body member 26. Preferably, only one surface would be supplied with the substantial friction-reducing coating.

Referring to FIGS. 1 and 2, an alternative embodiment of the bearing assembly disposed between nut 60 and body member 26 can include a self-contained bearing assembly, generally designated by the numeral 42. As shown in FIG. 2 for example, self-contained bearing assembly 42 includes an inner race 72, an outer race 74 and bearing elements 76 maintained therebetween. In a preferred embodiment, bearing elements 76 are ball bearings. Self-contained bearing assembly 42 may further include a shroud 78 surrounding the inner and outer races 72, 74 for maintaining the bearing assembly as a self-contained component. As shown in FIG. 2, inner race 72 includes an arcuate surface 73 that is dimensioned and configured to mate with a corresponding rearwardly-facing arcuate seating surface formed as ledge 38 of body member 26. Nut 60 is received for support on shroud 78, which is fixed to outer race 74 and is not in frictional contact with body 26 as in some prior art devices. Such mating relationship assists in alignment and minimization of both axial and radial stresses when the chuck is operated, as well as minimizing or eliminating frictional contact or rubbing between nut 60 and body 26. Further, such a relationship assists in maintaining the nut centered during tightening so as to provide more even tightening of the chuck and reducing run-out. This arrangement also maintains optimum thread engagement with each jaw, further increasing efficiency and reducing stress in both jaw and nut threads. In a preferred embodiment, self-contained bearing assembly 42 is an angular thrust bearing.

In a preferred embodiment as set forth above, sleeve member 22 is adapted to be loosely fitted over nose section 23 of chuck 20. Multiple drive ribs 68 of sleeve 22 engage the side walls of drive slots 66 of nut 60 so that sleeve 22 and nut 60 will be operatively connected or keyed together, i.e., when sleeve 22 is rotated, nut 60 will rotate therewith. As shown in FIG. 2, sleeve 22 may include an annular ledge portion 33 disposed about nose section 23 of body member 26. A nosepiece 58 is dimensioned and adapted to be pressed onto beveled nose portion 56 of nose section 23 to maintain sleeve 22 on chuck 20. It should be appreciated that nosepiece 58 could also be secured to body 26 by snap fitting, threading or the like. Nosepiece 58 is exposed when the chuck is assembled and, in one embodiment, may be coated with a non-ferrous metallic coating to prevent rust and to enhance its appearance. Examples of suitable coatings include zinc or nickel, however, it should be appreciated that any suitable coating could be utilized.

Nosepiece 58 serves to maintain sleeve member 22 in position on chuck 20 and in driving engagement with nut 60. Further, while a nosepiece and driving slot arrangement is illustrated, it should be appreciated that any suitable method of operative connection between the sleeve and the nut could be utilized within the scope of the present invention.

In addition, nosepiece 58 serves the dual purpose of providing an aesthetically pleasing cover for nose portion 56 that will resist rust. This provides the advantage of an aesthetically pleasing appearance without the necessity to coat the entire body member 26. If desired, the rear sleeve member 24 may be omitted and the sleeve member 22 extended to the tail end of body 26. This alternative configuration is particularly feasible when a spindle lock or the like is provided on the driver or when the driver is used to tighten or loosen the jaws.

The exterior circumferential surface of the sleeve member 22 may be knurled or may be provided with longitudinal ribs or other protrusions to enable the operator to grip it securely. In like manner, the outer circumferential surface of the rear sleeve member 24, if employed, may be knurled or ribbed if desired. The front and rear sleeves may be fabricated from a structural plastic such as polycarbonate, a filled polypropylene, for example, glass filled polypropylene, or a blend of structural plastic materials. Other composite materials such as, for example, graphite filled polymerics also would be suitable in certain environments. As will be appreciated by one skilled in the art, the materials from which the chuck of the present invention is fabricated will depend on the end use of the chuck, and the above are provided by way of example only.

It will be appreciated that rear sleeve member 24 is fixed to body member 26, while sleeve member 22 is operatively associated with nut 60 and rotatable with respect to body member 26. Because of the interaction between threads 34 on jaws 28 and threads 62 on nut 60, relative movement of the front and rear sleeve members, 22 and 24, causes jaws 28 to be advanced or retracted, depending upon the direction of relative movement.

Alternative embodiments of the chuck of the present invention combine different embodiments of the nut, the sleeve, the pawl member, the pawl holder, and the nut retainer with the remaining components shown in FIGS. 1–4 as described above. The arrangement and configuration of the different embodiments of the nut, the sleeve, the pawl member, the pawl holder, and the nut retainer are shown in FIGS. 5–13. The components and features in the embodiment of FIGS. 5–7 that correspond to components and features shown in FIGS. 1–4 are identified with the same designating numerals and the additional letter designation "a". Similarly, corresponding components and features are illustrated using the letter designation "b" for the alternative embodiment of FIGS. 8–10. Corresponding components and features are illustrated using the letter designation "c" for the alternative embodiment of FIGS. 11–13. These additional embodiments are described below in turn.

Figure 5:
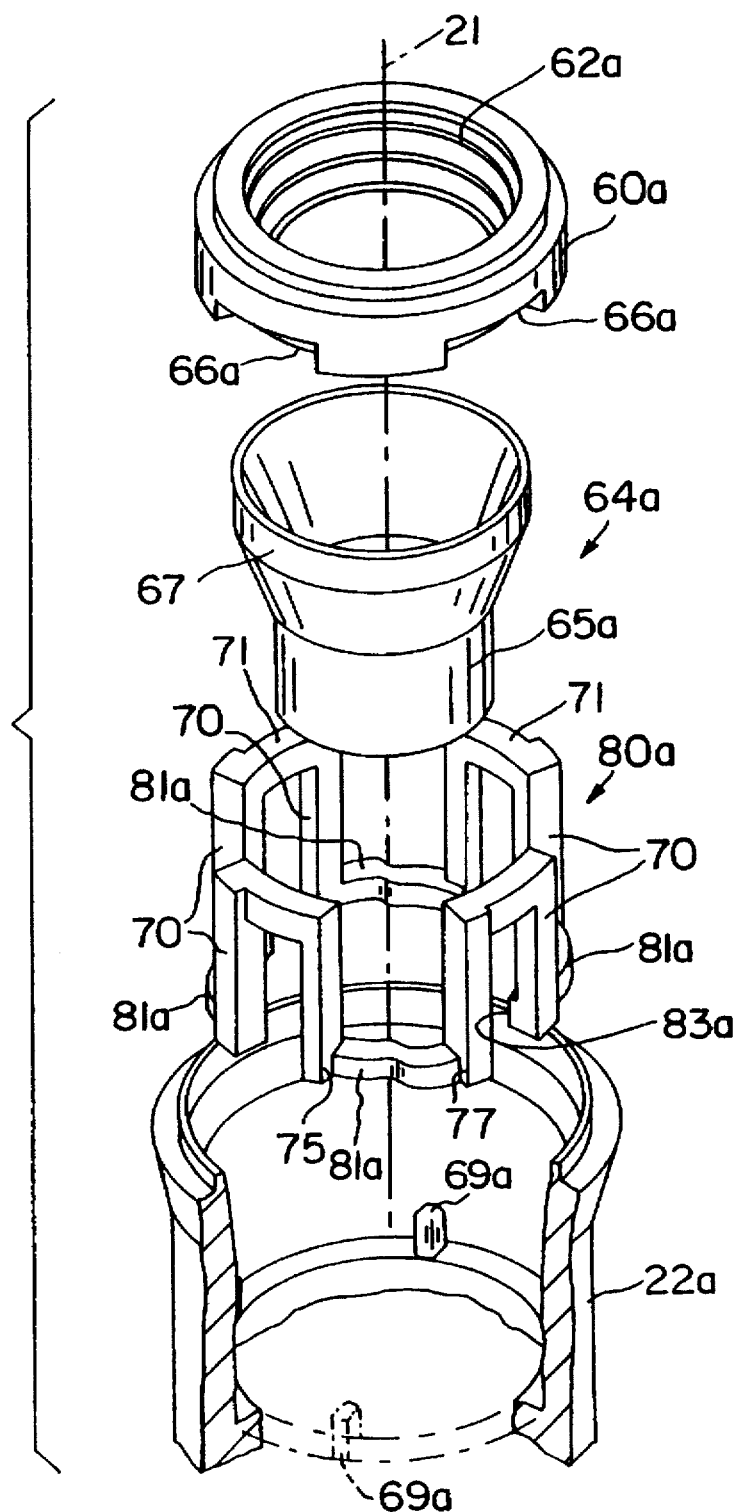
FIG. 5 is an elevated perspective assembly view of alternative embodiments of certain of the component parts illustrated in FIGS. 1–4.
Figure 6:
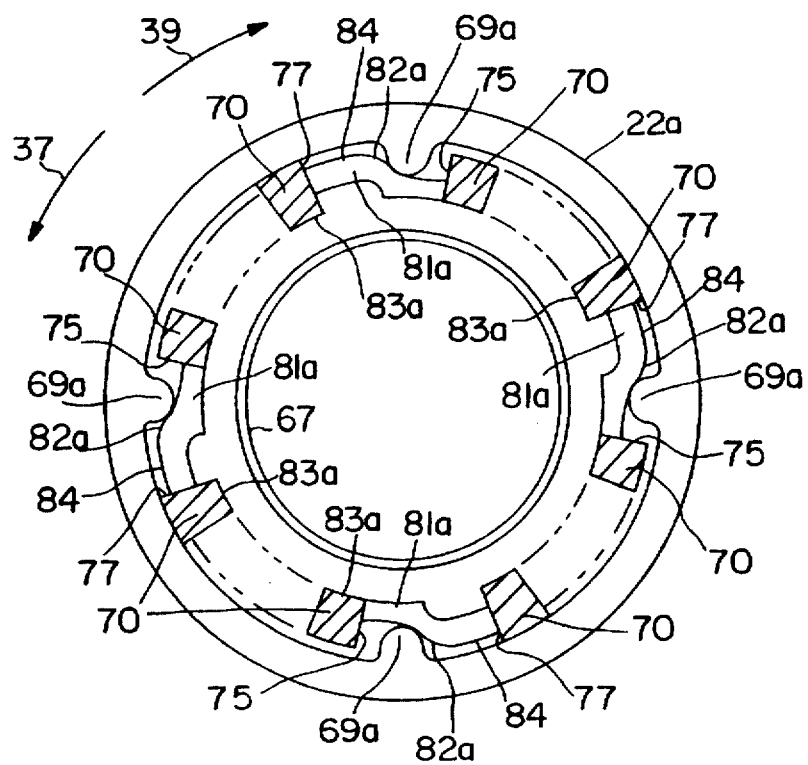
FIG. 6 is a cross-sectional view of the alternative embodiments shown in FIG. 5 as if they were assembled according to the view shown in FIG. 3 for the FIG. 1 embodiment and with the chuck in a opening or closing operative orientation.
Figure 7:
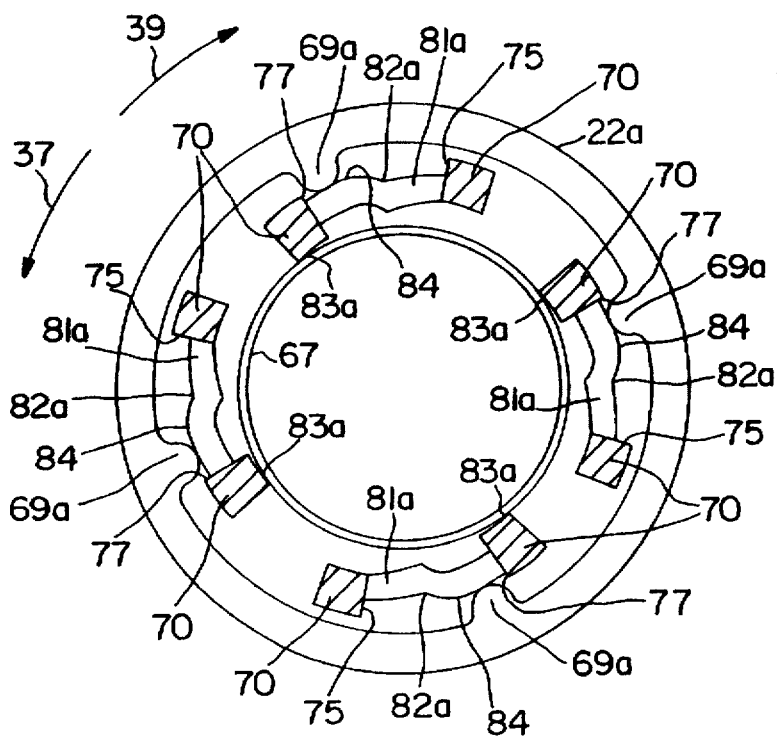
FIG. 7 is a cross-sectional view of the alternative embodiments shown in FIG. 5 as if they were assembled according to the view shown in FIG. 4 for the FIG. 1 embodiment and with the chuck in a locked operative orientation.

Turning first to the embodiment of FIGS. 5–7, central longitudinal axis 21 is depicted in FIG. 5 by the dashed vertical line. As shown in FIG. 5, a nut 60a includes threads 62a that are configured for mating with threads 34 on jaws 28 whereby when nut 60a is rotated with respect to body 26, the jaws 28 will be advanced or retracted in a particular direction along the longitudinal axis of the passageways 30. As shown in FIG. 5, nut 60a may include drive slots 66a for mating with a pawl member (described below).

As shown in FIG. 5, a nut retainer 64a includes a lower section 65a that has a cylindrically shaped interior surface and a cylindrically shaped exterior surface that is concentric with respect to the interior surface. Though not shown in FIG. 5, the interior surface of lower section 65a of nut retainer member 64a is press fitted to front cylindrical portion 53 of body member 26. Joined to the interior surface of lower section 65a is a second interior surface shaped in a truncated conical form. The exterior surface of nut retainer member 64a includes an engagement portion in the form of a friction wheel portion 67 that is cylindrically shaped with an unknurled or unridged surface. In a manner similar to that shown in FIG. 2, friction wheel portion 67 is disposed so that nut retainer 64a retains nut 60a from moving axially toward nose section 23 of body member 26. The exterior surface of nut retainer member 64a also includes a truncated conical surface disposed intermediate friction wheel portion 67 and lower section 65a.

A pawl member 80a is shown in FIG. 5, and in a manner similar to that shown in FIG. 2, pawl member 80a is configured and disposed about body member 26 and adjacent the engagement portion formed by friction wheel portion 67 of nut retainer member 64a. As shown in FIG. 5, pawl member 80a is configured generally as a cylindrically shaped lattice structure composed of vertical legs 70 connected at opposite ends to upper arms 71 and lower arms 81a. Each upper arm 71 is configured to fit snugly into a respective drive slot 66a of nut 60a. Thus, in the embodiment of FIGS. 5–7, the pawl holder is defined in nut 60a in the form of drive slots 66a. In this way, nut 60a and pawl member 80a cannot rotate with respect to one another and thus must rotate in unison.

As shown in FIGS. 5–7, pawl member 80a is configured with at least one resilient lower arm 81a that is biased toward sleeve member 22a in a radial direction relative to axis 21 of the chuck. As shown in FIGS. 5–7, four locking bosses 69a are carried evenly spaced around the interior surface of sleeve member 22a. In addition, pawl member 80a has four evenly spaced detent sections 82a that are configured in resilient lower arms 81a as shown in FIG. 6 to engage respective locking bosses 69a in a manner whereby pawl member 80a is rotated in unison with sleeve member 22a. Since nut 60a is locked to pawl member 80a via the interlock between drive slots 66a and upper arms 71 of pawl member 80a, rotation of pawl member 80a in unison with sleeve 22a results in rotation of nut 60a in unison with sleeve 22a. In this way, rotation of sleeve 22a by the operator will rotate nut 60a and move jaws 28 as set forth above.

As shown in FIGS. 6 and 7, a plurality of first stop flanges 75 is disposed on the exterior surface of pawl member 80a to prevent over-rotation of each locking boss 69a relative to pawl member 80a in a first direction indicated by the arrow 39. This is the direction for untightening, i.e., loosening, the grip of the jaws 28 of the chuck from the shank of a tool. As each locking boss 69a butts against a corresponding opposed first stop flange 75, sleeve member 22a drives pawl member 80a in a first circumferential direction indicated by arrow 39 in FIGS. 6 and 7. Moreover, when each locking boss 69a engages each respective detent section 82a of pawl member 80a, each locking boss 69a drives pawl member 80a in a second circumferential direction indicated by arrow 37 in FIGS. 6 and 7. This is the direction for tightening the grip of the jaws 28 of the chuck around the shank of a tool. The overall effect of this arrangement is direct rotational drive of pawl member 80a and nut 60a by rotation of sleeve member 22a by the operator. Moreover, a plurality of second stop flanges 77 is disposed on the exterior surface of pawl member 80a to prevent over-rotation of each locking boss 69a relative to pawl member 80a when the chuck's jaws are being tightened around the shank of a tool.

In addition, as shown in FIGS. 5–7 pawl member 80a has four evenly spaced cam sections 84, one configured in the exterior surface of each resilient lower arm 81a. As shown in FIG. 7, each cam section 84 is configured to engage a respective locking boss 69a in a manner whereby pawl member 80a becomes configured and disposed so as to become nonrotatable with respect to body member 26 (not shown in FIG. 7) and sleeve member 22a. This nonrotatable state is shown in FIG. 7 and persists until a predetermined releasing torque is applied by the operator between sleeve member 22a and body member 26. In order to attain this nonrotatable state starting from the chuck's operating condition shown in FIG. 6, the operator must apply a locking torque to the sleeve in the direction indicated by arrow 37. This locking torque must overcome the mechanical and frictional engagement between detent section 82a and locking boss 69a as well as the tension in resilient arm 81a.

As shown in FIGS. 5–7, pawl member 80a includes at least one engagement section 83a. Each engagement section 83a is disposed on the interior surface of pawl member 80a where each lower arm 81a meets each vertical leg 70. As shown in FIG. 7, an engagement section 83a of each lower arm 81a frictionally engages the exterior surface of friction wheel portion 67 of nut retainer 64a, which is fixed to the body member (not shown in FIG. 7). Thus, each engagement section 83a is configured and disposed to become selectively engaged with the exterior surface of friction wheel portion 67. Moreover, the exterior surface of friction wheel portion 67 may be knurled, unknurled, ridged or unridged.

Upon engagement of each engagement section 83a with friction wheel portion 67 as shown in FIG. 7, pawl member 80a and sleeve member 22a become constrained against rotation with respect to body member 26 until a predetermined restraining torque is overcome by the application of a predetermined releasing torque by the operator. Once disposed as shown in FIG. 7, if the releasing torque is applied in a first direction indicated by the arrow 39, it must overcome the frictional engagement between engagement section 83a and friction wheel portion 67 on the one hand and between cam section 84 and locking boss 69a on the other hand. The magnitude of the releasing torque that is required to disengage friction wheel portion 67 and engagement section 83a exceeds the magnitude of the releasing torque that is required to disengage detent section 82a and locking boss 69a.

As shown in FIG. 7, locking boss 69a deflects arm 81a resiliently radially (in a general sense) inwardly toward the central axis 21 of the chuck as locking boss engages cam section 84 and forces engagement section 83a against the engagement portion formed by friction wheel portion 67. In this way, the frictional engagement between pawl member 80a and friction wheel portion 67 provides a restraining torque that prevents rotation of sleeve 22a in the direction of arrow 39. So long as this engagement does not slip, then sleeve member 22a, nut 60a and pawl member 80a become nonrotatable relative to one another and relative to body member 26. Thus, pawl member 80a, locking boss 69a and friction wheel portion 67 are configured so that a circumferentially directed force (torque) is needed to overcome the engagement between friction wheel portion 67 and engagement section 83a and between cam section 84 and locking boss 69a.

Figure 8:
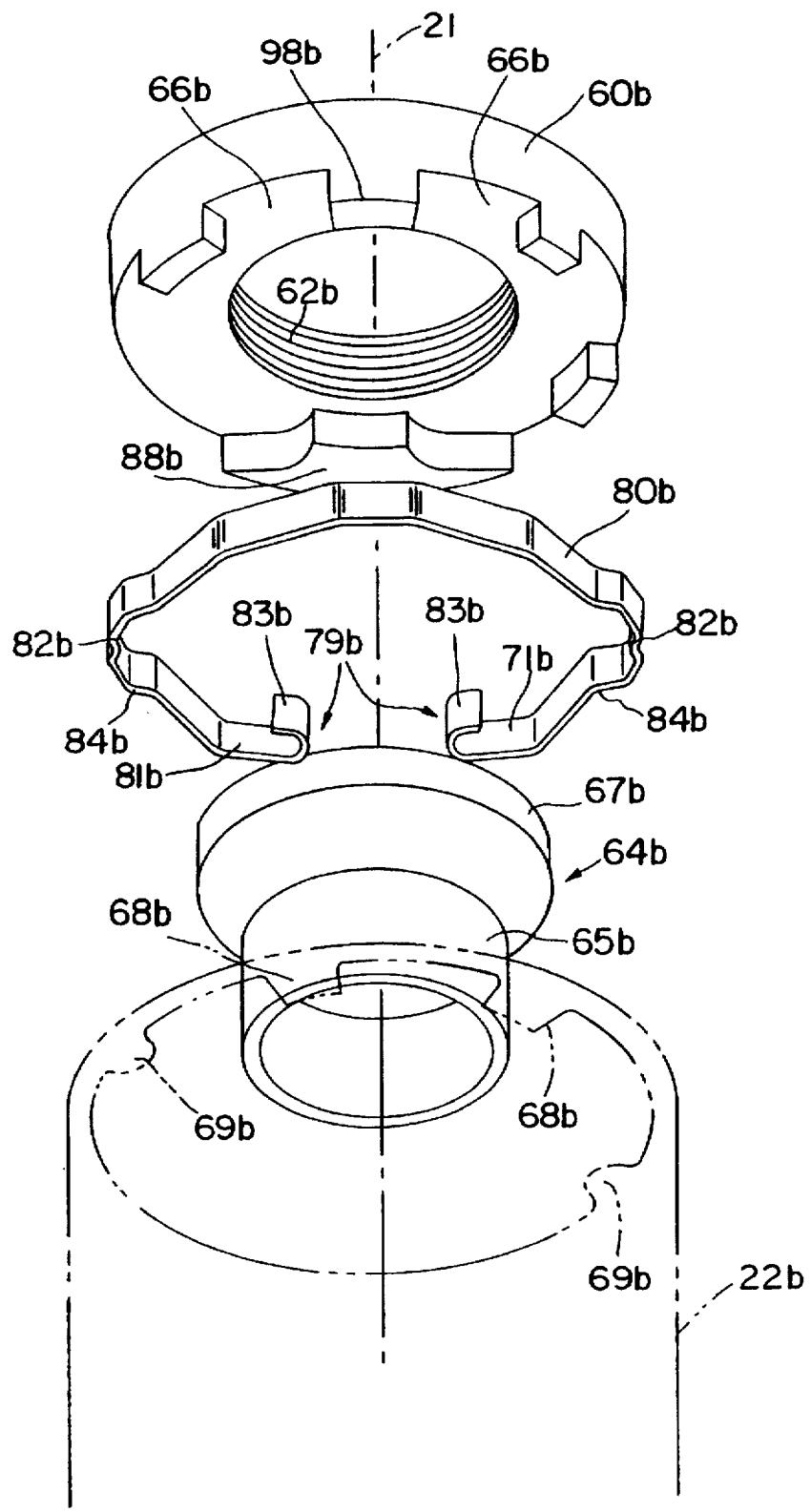
FIG. 8 is an elevated perspective assembly view of alternative embodiments of certain of the component parts illustrated in FIGS. 1–4.
Figure 9:
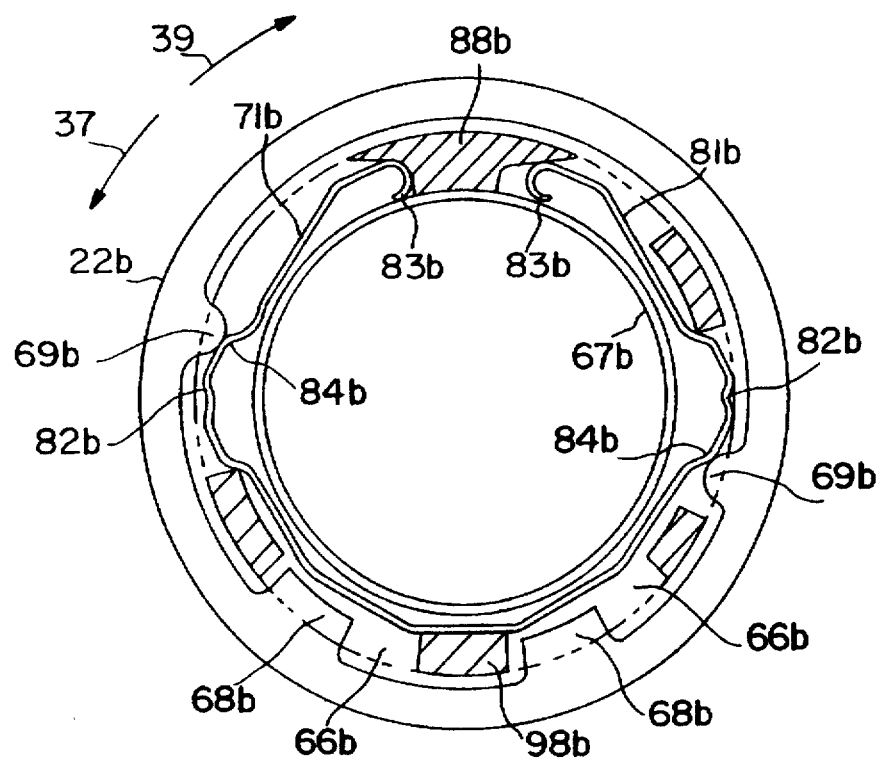
FIG. 9 is a cross-sectional view of the alternative embodiments shown in FIG. 8 as if they were assembled according to the view shown in FIG. 3 for the FIG. 1 embodiment and with the chuck in a opening or closing operative orientation.
Figure 10:
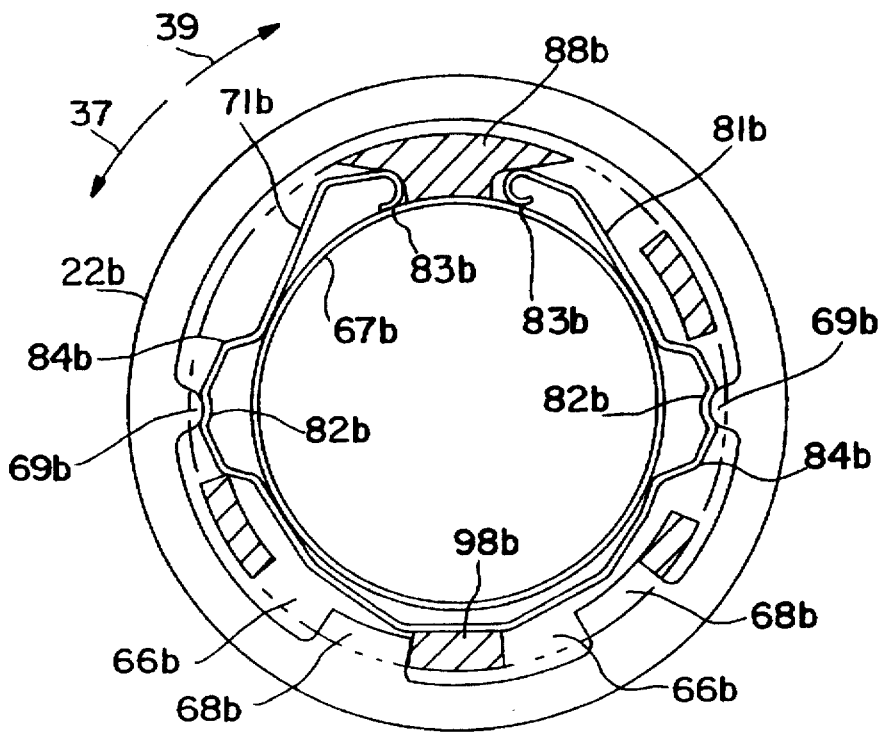
FIG. 10 is a cross-sectional view of the alternative embodiments shown in FIG. 8 as if they were assembled according to the view shown in FIG. 4 for the FIG. 1 embodiment and with the chuck in a locked operative orientation.

Turning to the embodiment of FIGS. 8–10, a dashed line designated by the numeral 21 in FIG. 8 depicts the central longitudinal axis 21 of the chuck that includes a nut 60b having threads 62b. These threads 62b are configured for mating with threads 34 on jaws 28 whereby when nut 60b is rotated with respect to body 26, the jaws 28 will be advanced or retracted in a particular direction along the longitudinal axis of the passageways 30. As shown in FIG. 8, nut 60b may include drive slots 66b for mating with drive ribs 68b (shown in phantom by the dashed lines) of a sleeve member 22b (shown in phantom). In this way nut 60b is keyed to sleeve 22b so that when sleeve 22b is rotated, nut 60b will rotate therewith and move jaws 28 as set forth above. As shown in FIG. 10, when drive ribs 68b of sleeve 22b butt against the side walls of drive slots 66b of nut 60b, the operator can effect direct drive of nut 60b by rotation of sleeve member 22b.

As shown in FIG. 8, a nut retainer 64b has a lower section 65b that has a cylindrically shaped interior surface and a cylindrically shaped exterior surface that is concentric with respect to the interior surface. Though not shown in FIG. 8, the interior surface of lower section 65b of nut retainer member 64b is press fitted to front cylindrical portion 53 of lower body member 26. Joined to the interior surface of lower section 65b is a second interior surface shaped in a truncated conical form. The exterior surface of nut retainer member 64b includes an engagement portion in the form of a friction wheel portion 67b that is cylindrically shaped with an exterior surface. The exterior surface of friction wheel portion 67b may be knurled, unknurled, ridged or unridged. The exterior surface of nut retainer member 64b also includes a truncated conical surface disposed intermediate friction wheel portion 67b and lower section 65b. In a manner similar to that shown in FIG. 2, friction wheel portion 67b is disposed so that nut retainer 64b retains nut 60b from moving axially toward nose section 23 of body member 26.

A pawl member 80b is shown in FIG. 8, and in a manner similar to that shown in FIG. 2, pawl member 80b is configured and disposed about body member 26 and adjacent friction wheel portion 67b of nut retainer member 64b. As shown in FIGS. 8–10, pawl member 80b is configured with at least one resilient arm 81b that is biased toward sleeve member 22b in a radial direction relative to central axis 21 of the chuck. A second resilient arm 71b is also biased toward sleeve member 22b in a radial direction in the embodiment shown in FIGS. 8–10. As shown in FIG. 8, each resilient arm 81b, 71b terminates in a looped end 79b. As shown in FIGS. 9 and 10, pawl member 80b is wedged and intertwined between a pair of pegs 88b, 98b that are disposed generally opposite each other and formed in nut 60b. Each opposed end of peg 88b is configured to receive one of looped ends 79b. Pegs 88b, 98b hold pawl member 80b so that pawl member 80b cannot rotate as a whole with respect to nut 60b, but the looped ends 79b of pawl holder 80b can move circumferentially and radially with respect to nut 60b. Thus, in the embodiment of FIGS. 8–10, the pawl holder is defined in nut 60b in the form of pegs 88b, 98b, and pawl member 80b and nut 60b must rotate in unison. Moreover, in the sequence starting from FIG. 9 and progressing to FIG. 10, looped ends 79b progress from being spaced apart from friction wheel portion 67b to touching friction wheel portion 67b.

As shown in FIGS. 8–10 for example, pawl member 80b includes at least one engagement section 83b and at least one detent section 82b. Each engagement section 83b is disposed at the exterior of a looped end 79b of pawl member 80b. In the embodiment shown in FIGS. 8–10, two engagement sections 83b and two detent sections 82b are defined in pawl member 80b. Each engagement section 83b is configured and disposed adjacent the exterior surface of friction wheel portion 67b of nut retainer 64b, which is fixed to body member 26. Moreover, a cam section 84b is defined in pawl member 80b and disposed between each engagement section 83b and each detent section 82b.

In addition, at least one locking boss 69b is carried by sleeve member 22b. In the embodiment shown, two locking bosses 69b are defined to extend radially from the interior surface of sleeve member 22b. Each detent section 82b is configured as shown in FIG. 10 to engage its corresponding locking boss 69b in a manner whereby pawl member 80b becomes more strongly biased radially toward friction wheel portion 67b of nut retainer 64b and thereby disposed so as to become nonrotatable with respect to body member 26 and sleeve member 22b. This nonrotatable state is shown in FIG. 10 and persists until a predetermined releasing torque is applied by the operator between sleeve member 22b and body member 26. In order to attain this nonrotatable state starting from the chuck's operating condition shown in FIG. 9, the operator must apply a locking torque to the sleeve 22b in the direction indicated by arrow 37. This locking torque must overcome the mechanical biasing effect of compressing looped ends 79b, the mechanical and frictional engagement between cam sections 84b and respective locking bosses 69b, as well as the tension in resilient arms 81b, 71b.

Upon engagement with friction wheel portion 67b, pawl member 80b and sleeve member 22b become constrained against rotation with respect to body member 26 until a predetermined restraining torque is overcome by the application of a predetermined releasing torque by the operator. The releasing torque is applied to sleeve 22b in a first direction indicated in FIGS. 9 and 10 by the arrow 39. The releasing torque must overcome the combined mechanical and frictional engagement between friction wheel portion 67b and engagement section 83b on the one hand and between detent section 82b and locking boss 69b on the other hand. Typically, the magnitude of the releasing torque that is required to disengage friction wheel portion 67b and engagement section 83b exceeds the magnitude of the locking torque that is required to engage detent section 82b and locking boss 69b.

As shown in FIG. 10, each locking boss 69b deflects arm 81b, 71b resiliently radially (in a general sense) inwardly toward the central axis 21 of chuck 20 and forces each engagement section 83b more strongly against the exterior surface of friction wheel portion 67b. In comparing FIGS. 9 and 10, note that the radially directed biasing force is sufficient to reduce the internal diameters of looped ends 79b of pawl member 80b as engagement sections 83b become biased more strongly against friction wheel portion 67b. In this way, the engagement between pawl member 80b and friction wheel portion 67b provides a restraining torque that prevents loosening of the grip of jaws 28 on the shank of the tool during the vibration that occurs during use of the tool by the operator. So long as this engagement does not slip, then sleeve member 22b, nut 60b and pawl member 80b become nonrotatable relative to one another and relative to body member 26. Thus, pawl member 80b, locking boss 69b and friction wheel portion 67b are configured so that a circumferentially directed force (torque) is needed to overcome the engagement between friction wheel portion 67b and engagement section 83b and between detent section 82b and locking boss 69b.

Figure 11:
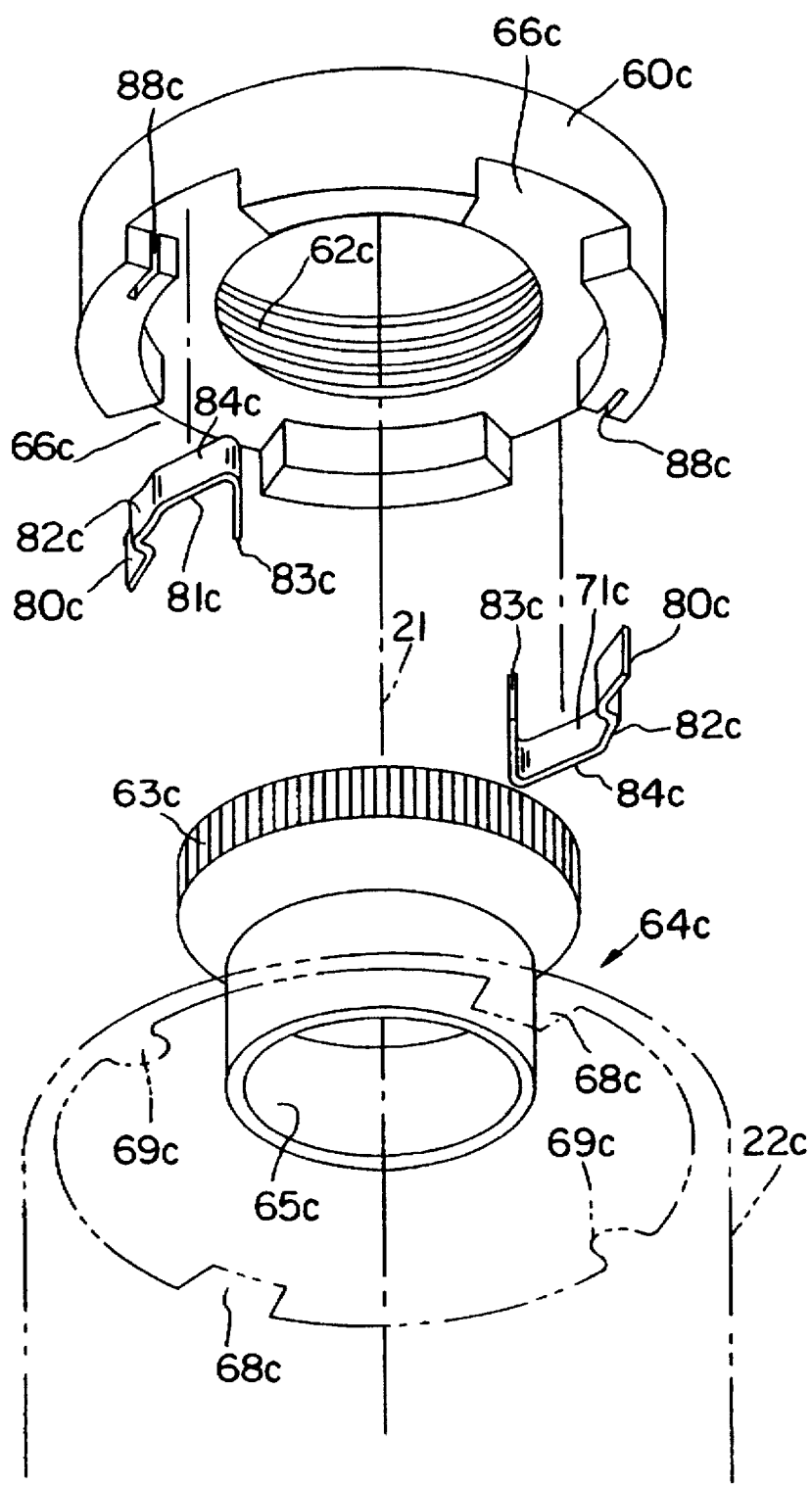
FIG. 11 is an elevated perspective assembly view of alternative embodiments of certain of the component parts illustrated in FIGS. 1–4.
Figure 12:
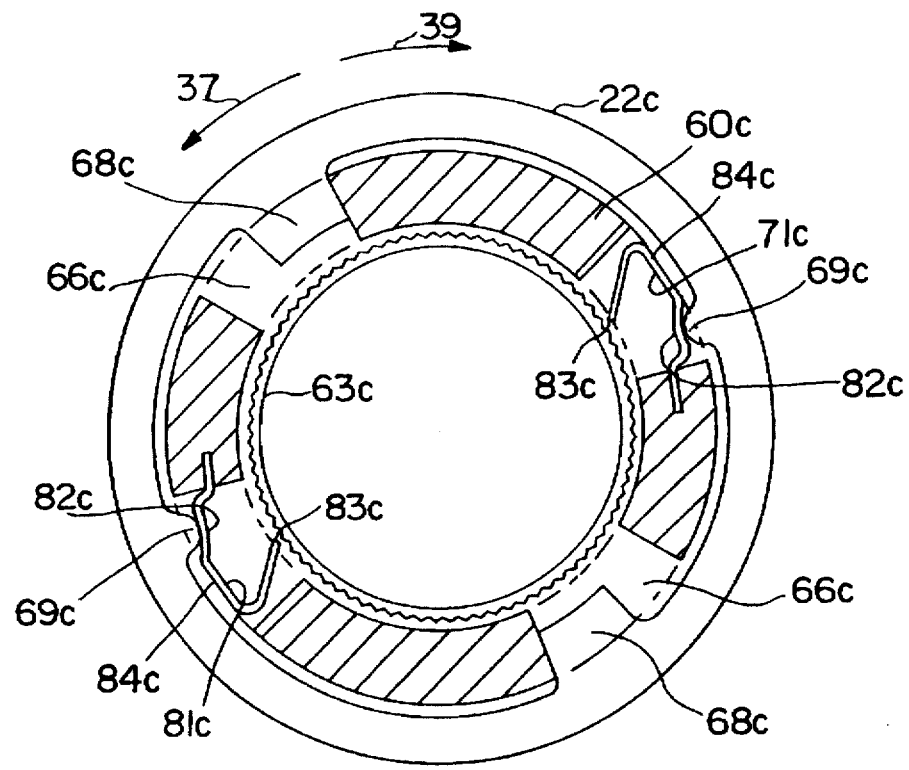
FIG. 12 is a cross-sectional view of the alternative embodiments shown in FIG. 11 as if they were assembled according to the view shown in FIG. 3 for the FIG. 1 embodiment and with the chuck in a opening or closing operative orientation.
Figure 13:
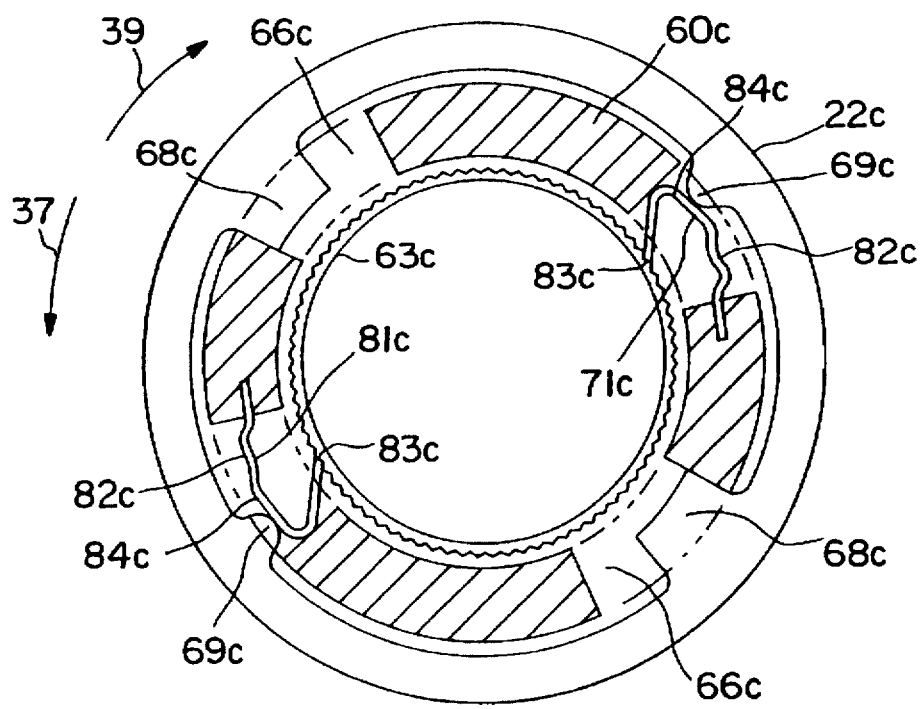
FIG. 13 is a cross-sectional view of the alternative embodiments shown in FIG. 11 as if they were assembled according to the view shown in FIG. 4 for the FIG. 1 embodiment and with the chuck in a locked operative orientation.

Turning to the embodiment of FIGS. 11-13, a dashed line designated by the numeral 21 in FIG. 11 depicts the central longitudinal axis 21 of the chuck that includes a nut 60c having threads 62c. These threads 62c are configured for mating with threads 34 on jaws 28 whereby when nut 60c is rotated with respect to body 26, the jaws 28 will be advanced or retracted in a particular direction along the longitudinal axis of the passageways 30. As shown in FIGS. 11-13, nut 60c may include drive slots 66c for mating with drive ribs 68c (shown in phantom in FIG. 11) of a sleeve member 22c (shown in phantom in FIG. 11). When drive ribs 68c of sleeve 22c butt against one of the side walls defining drive slots 66c, nut 60c is keyed to sleeve 22c so that when sleeve 22c is rotated, nut 60c will rotate therewith and move jaws 28 as set forth above. As shown in FIG. 12, when drive ribs 68c of sleeve 22c butt against the side walls of drive slots 66c of nut 60c, the operator can effect direct drive of nut 60c by rotation of sleeve member 22c.

As shown in FIG. 11, a nut retainer 64c has a lower section 65c that has a cylindrically shaped interior surface and a cylindrically shaped exterior surface that is concentric with respect to the interior surface. Though not shown in FIG. 11, the interior surface of lower section 65c of nut retainer member 64c is press fitted to front cylindrical portion 53 of body member 26. Joined to the interior surface of lower section 65c is a second interior surface shaped in a truncated conical form. As shown in FIG. 11, the exterior surface of nut retainer member 64c includes an engagement portion in the form of a ratchet wheel portion 63c that is shaped cylindrically with a knurled or ridged surface. The exterior surface of nut retainer member 64c also includes a truncated conical surface disposed intermediate ratchet wheel portion 63c and lower section 65c. In a manner similar to that shown in FIG. 2, ratchet wheel portion 63c is disposed so that nut retainer 64c retains nut 60c from moving axially toward nose section 23 of body member 26.

At least one pawl member 80c is shown in FIGS. 11-13, and in a manner similar to that shown in FIG. 2, each pawl member 80c is configured and disposed about body member 26 and adjacent ratchet wheel portion 63c of nut retainer member 64c. Pawl member 80c is configured with a resilient arm 81c that is biased toward sleeve member 22c in a radial direction relative to central axis 21 of the chuck. A second pawl member 80c also has a resilient arm 71c that is also biased toward sleeve member 22c in a radial direction.

As shown in FIGS. 11-13 for example, each pawl member 80c includes at least one engagement section 83c that is configured and disposed to become selectively engaged with the teeth forming the knurled or ridged surface of ratchet wheel portion 63c. Each engagement section 83c is configured and disposed adjacent the exterior surface of ratchet wheel portion 63c of nut retainer 64c, which is fixed to body member 26.

Each pawl member 80c is fixed to nut 60c. This can be accomplished by spot welding or gluing for example. However, as shown in FIGS. 12 and 13, each pawl member 80c has one end wedged into one of two holding grooves 88c that are formed in nut 60c. The wedged end is the end disposed opposite to engagement section 83c. Holding grooves 88c retain pawl members 80c so that pawl members 80c cannot rotate as a whole with respect to nut 60c. However, the ends of resilient pawl holders 80c carrying engagement sections 83c can move between the position shown in FIG. 12 and the position shown in FIG. 13. Thus, in the embodiment of FIGS. 11-13, the pawl holder is defined in nut 60c in the form of holding grooves 88c, and pawl members 80c and nut 60c must rotate in unison.

As shown in FIGS. 11-13 for example, each pawl member 80c includes at least one detent section 82c. In the embodiment shown in FIGS. 11-13, there are two detent sections 82c, one detent section 82c defined in each pawl member 80c. Each detent section 82c is disposed at the exterior of a resilient arm 81c, 71c of pawl member 80c.

Moreover, at least one locking boss 69c is carried by sleeve member 22c. In the embodiment shown in FIGS. 11-13, two locking bosses 69c are defined to extend radially from the interior surface of sleeve member 22c. Each detent section 82c is configured as shown in FIG. 12 to engage its corresponding locking boss 69c. When so engaged as shown in FIG. 12, each drive rib 68c butts against one of the side walls of a respective drive slot 66c of nut 60c. Accordingly, rotation of sleeve 22c in the loosening direction indicated by arrow 39 results in direct drive of pawl members 80c and nut 60c, which is fixed to pawl members 80c. Similarly, rotation of sleeve 22c in the tightening direction indicated by the arrow 37 results in direct drive of pawl members 80c and nut 60c.

In addition, as shown in FIGS. 11-13 each pawl member 80c has a cam section 84c disposed between each engagement section 83c and respective detent section 82c on the exterior surface of each resilient arm 81c, 71c. Each cam section 84c is configured as shown in FIG. 13 to engage its corresponding locking boss 69c in a manner that forces each corresponding engagement section 83c between adjacent ones of the teeth formed on ratchet wheel portion 63c. As sleeve is rotated in the direction of arrow 37 from the operating condition shown in FIG. 12, the operator must apply to the sleeve 22c in the direction indicated by arrow 37, a locking torque that is sufficient to overcome the mechanical and frictional engagement between detent sections 82c and respective locking bosses 69c as well as the tension in resilient arms 81c, 71c in order to force locking bosses 69c to ride onto cam sections 84c of pawl members 80c. Each locking boss 69c deflects a respective opposed arm 81c, 71c resiliently radially (in a general sense) inwardly toward the central axis 21 of chuck 20 and forces engagement section 83c toward the exterior surface of ratchet wheel portion 63c until the operating condition shown in FIG. 13 is attained. When the FIG. 13 operating condition of the chuck is attained, each drive rib 68c is disposed to butt against one of the side walls of the respective drive slot 66c of nut 60c and the engagement between each pawl member 80c and ratchet wheel portion 63c provides a restraining torque against rotation of sleeve 22c and nut 60c in the direction of arrow 39. So long as this engagement does not slip, then sleeve member 22c, nut 60c and each pawl member 80c become nonrotatable in the loosening direction (indicated by arrow 39) relative to one another and relative to body member 26. Thus, each pawl member 80c, locking boss 69c and ratchet wheel portion 63c are configured so that a circumferentially directed force (torque) is needed to overcome the engagement between ratchet wheel portion 63c and each engagement section 83c.

The nonrotatable state is shown in FIG. 13 persists until a predetermined releasing torque is applied by the operator between sleeve member 22c and body member 26. The releasing torque is applied in a first direction indicated by the arrow 39 and must overcome the combined mechanical and frictional engagement between ratchet wheel portion 63c and each engagement section 83c.

Referring to FIGS. 12 and 13, when the operator rotates sleeve 22c with respect to body member 26 in the direction of the arrow designated 37 and nut 60c is rotating in unison with sleeve 22c, then jaws 28 are tightening onto the shank of a tool placed in the axial bore 27 (not shown in FIGS. 12 and 13). When the operator rotates sleeve 22c with respect to body member 26 in the direction of the arrow designated 39 in FIGS. 12 and 13, jaws 28 are being untightened from the shank of a tool placed in the axial bore 27. FIG. 12 illustrates one of the chuck's operating conditions in which drive ribs 68c butt against one of the side walls of drive slots 66c, and rotation of sleeve 22c in the direction of arrow 39 directly drives nut 60c in the direction that separates the tool engaging faces 32 of jaws 28. When the chuck is in this untightening operating condition shown in FIG. 12, locking bosses 69c engage detent sections 82c of pawl members 80c, which are biased radially outwardly toward sleeve 22c, but engagement sections 83c do not engage the teeth of ratchet wheel portion 63c. Drive ribs 68c of sleeve 22c butt against the side walls of respective drive slots 66c of nut 60c. When the chuck is in the operating state shown in FIG. 12, rotation of sleeve 22c in the direction of arrow 37 will result in tightening of the chuck's jaws about the shank of a tool, provided that locking bosses 69c continue to engage detent sections 82c. However, once further tightening of the chuck causes locking bosses 69c to disengage from detent section 82c, then sleeve 22c may rotate relative to nut 60c and no further tightening occurs until drive ribs 68c butt against the side walls of drive slots 66c of nut 60c.

FIG. 13 illustrates one of the chuck's operating conditions in which the jaws of the chuck are locked onto the shank of a tool and a restraining torque is applied so as to counteract loosening of the chuck's grip due to vibrational effects. In this state, locking bosses 69c engage cam sections 84c of pawl members 80 so as to force engagement sections 83c against the teeth of ratchet wheel portion 63c of retainer member 64c. As long as locking bosses 69c continue to engage cam sections 84c of pawl members 80c, rotation of sleeve 22c and nut 60c in the direction of arrow 39 will be prevented.

While the above description is set forth with respect to a keyless chuck, it should be appreciated that the principles of the present invention are equally applicable to a keyed chuck, and such is within the scope of the present invention.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A chuck for holding the shank of a tool to be used with a manual or powered driver having a rotatable drive shaft, said chuck comprising:

a) a generally cylindrical body member having a nose section and a tail section, said tail section having an axial bore formed therein to mate with the drive shaft of the driver, said nose section having an axial bore formed therein and a plurality of angularly disposed passageways formed therethrough and intersecting said axial bore of said nose section;

b) a plurality of jaws, a separate one of said jaws being slidably positioned in one of each of said angularly disposed passageways, each of said jaws having a jaw face formed on one side thereof and threads formed on the opposite side thereof;

c) a nut rotatably mounted relative to said body member and in engagement with said threads on said jaws;

d) a generally cylindrical sleeve member configured and disposed in driving engagement with said nut and overlying said nose section of said body member whereby rotation of said sleeve member with respect to said body member effects movement of said jaws;

e) a pawl member configured and disposed such that when said jaws are desirably gripping the shank of the tool, said pawl member can be disposed to become constrained against rotation with respect to said nut and said body member so that a predetermined releasing torque must be applied before said nut can rotate with respect to said body member;

f) a nut retainer configured and disposed with respect to said body member to limit travel of said nut in the axial direction relative to said body member, said nut retainer defining an engagement portion; and g) wherein said pawl member being configured to engage said engagement portion when said jaws are desirably gripping the shank of the tool and said pawl member becomes thereby constrained against rotation with respect to said body member until a predetermined releasing torque is applied to permit said nut to rotate with respect to said body member.

2. A chuck for use with a manual or powered driver as stated in claim 1, wherein said engagement portion includes a ratchet wheel portion.

3. A chuck for use with a manual or powered driver as stated in claim 1, wherein said engagement portion includes a friction wheel portion.

4. A chuck for holding the shank of a tool to be used with a manual or powered driver having a rotatable drive shaft, said chuck comprising:

a) a generally cylindrical body member having a nose section and a tail section, said tail section having an axial bore formed therein to mate with the drive shaft of the driver, said nose section having an axial bore formed therein and a plurality of angularly disposed passageways formed therethrough and intersecting said axial bore of said nose section;

b) a plurality of jaws, a separate one of said jaws being slidably positioned in one of each of said angularly disposed passageways, each of said jaws having a jaw face formed on one side thereof and threads formed on the opposite side thereof;

c) a nut rotatably mounted relative to said body member and in engagement with said threads on said jaws;

d) a generally cylindrical sleeve member configured and disposed in driving engagement with said nut and overlying said nose section of said body member whereby rotation of said sleeve member with respect to said body member effects movement of said jaws;

e) a pawl member configured and disposed such that when said jaws are desirably gripping the shank of the tool, said pawl member can be disposed to become constrained against rotation with respect to said nut and said body member so that a predetermined releasing torque must be applied before said nut can rotate with respect to said body member; and f) a pawl holder, said pawl member being nonrotatably held by said pawl holder and said pawl holder being nonrotatably carried by said nut.

5. A chuck for use with a manual or powered driver as stated in claim 4, further comprising:

g) a nut retainer configured and disposed with respect to said body member to limit travel of said nut in the axial direction relative to said body member, said nut retainer defining an engagement portion; and h) wherein said pawl member being configured to engage said engagement portion when said jaws are desirably gripping the shank of the tool and said pawl member becomes thereby constrained against rotation with respect to said body member until a predetermined releasing torque is applied to permit said nut to rotate with respect to said body member.

6. A chuck for holding the shank of a tool to be used with a manual or powered driver having a rotatable drive shaft, said chuck comprising:

a) a generally cylindrical body member having a nose section and a tail section, said tail section having an axial bore formed therein to mate with the drive shaft of the driver, said nose section having an axial bore formed therein and a plurality of angularly disposed passageways formed therethrough and intersecting said axial bore of said nose section;

b) a plurality of jaws, a separate one of said jaws being slidably positioned in one of each of said angularly disposed passageways, each of said jaws having a jaw face formed on one side thereof and threads formed on the opposite side thereof;

c) a nut rotatably mounted relative to said body member and in engagement with said threads on said jaws;

d) a generally cylindrical sleeve member configured and disposed in driving engagement with said nut and overlying said nose section of said body member whereby rotation of said sleeve member with respect to said body member effects movement of said jaws;

e) a pawl member configured and disposed such that when said jaws are desirably gripping the shank of the tool, said pawl member can be disposed to become constrained against rotation with respect to said nut and said body member so that a predetermined releasing torque must be applied before said nut can rotate with respect to said body member; and f) a pawl holder, said pawl member being nonrotatably held by said pawl holder and said pawl holder being defined in said nut.

7. A chuck for holding the shank of a tool to be used with a manual or powered driver having a rotatable drive shaft, said chuck comprising:

a) a generally cylindrical body member having a nose section and a tail section, said tail section having an axial bore formed therein to mate with the drive shaft of the driver, said nose section having an axial bore formed therein and a plurality of angularly disposed passageways formed therethrough and intersecting said axial bore of said nose section;

b) a plurality of jaws, a separate one of said jaws being slidably positioned in one of each of said angularly disposed passageways, each of said jaws having a jaw face formed on one side thereof and threads formed on the opposite side thereof;

c) a nut rotatably mounted relative to said body member and in engagement with said threads on said jaws;

d) a generally cylindrical sleeve member configured and disposed in driving engagement with said nut and overlying said nose section of said body member whereby rotation of said sleeve member with respect to said body member effects movement of said jaws;

e) a pawl member configured and disposed such that when said jaws are desirably gripping the shank of the tool, said pawl member can be disposed to become constrained against rotation with respect to said nut and said body member so that a predetermined releasing torque must be applied before said nut can rotate with respect to said body member;

f) a pawl holder, said pawl member being nonrotatably held by said pawl holder and having at least one travel slot configured to limit relative rotational movement between said sleeve member and said pawl holder;

g) a nut retainer configured and disposed with respect to said body member to limit travel of said nut in the axial direction relative to said body member, said nut retainer defining an engagement portion; and h) wherein said pawl member being configured to engage said engagement portion when said jaws are desirably gripping the shank of the tool and said pawl member becomes thereby constrained against rotation with respect to said body member until a predetermined releasing torque is applied to permit said nut to rotate with respect to said body member.

8. A chuck for holding the shank of a tool to be used with a manual or powered driver having a rotatable drive shaft, said chuck comprising:

a) a generally cylindrical body member having a nose section and a tail section, said tail section having an axial bore formed therein to mate with the drive shaft of the driver, said nose section having an axial bore formed therein and a plurality of angularly disposed passageways formed therethrough and intersecting said axial bore of said nose section;

b) a plurality of jaws, a separate one of said jaws being slidably positioned in one of each of said angularly disposed passageways, each of said jaws having a jaw face formed on one side thereof and threads formed on the opposite side thereof;

c) a nut rotatably mounted relative to said body member and in engagement with said threads on said jaws;

d) a generally cylindrical sleeve member configured and disposed in driving engagement with said nut and overlying said nose section of said body member whereby rotation of said sleeve member with respect to said body member effects movement of said jaws;

e) a pawl member configured and disposed such that when said jaws are desirably gripping the shank of the tool, said pawl member can be disposed to become constrained against rotation with respect to said nut and said body member so that a predetermined releasing torque must be applied before said nut can rotate with respect to said body member; and f) a pawl holder, said pawl member being nonrotatably held by said pawl holder and having at least one travel slot configured to limit relative rotational movement between said sleeve member and said pawl holder, wherein said sleeve member defines at least one drive rib and wherein said at least one travel slot is defined by a forward stop wall and a rearward stop wall, said travel slot being configured to receive said at least one drive rib and permit relative movement between said sleeve member and said pawl holder corresponding to movement of said at least one drive rib within said at least one travel slot between said rearward wall and said forward wall.

9. A chuck for holding the shank of a tool to be used with a manual or powered driver having a rotatable drive shaft, said chuck comprising:

a) a generally cylindrical body member having a nose section and a tail section, said tail section having an axial bore formed therein to mate with the drive shaft of the driver, said nose section having an axial bore formed therein and a plurality of angularly disposed passageways formed therethrough and intersecting said axial bore of said nose section;

b) a plurality of jaws, a separate one of said jaws being slidably positioned in one of each of said angularly disposed passageways, each of said jaws having a jaw face formed on one side thereof and threads formed on the opposite side thereof;

c) a nut rotatably mounted relative to said body member and in engagement with said threads on said jaws;

d) a generally cylindrical sleeve member configured and disposed in driving engagement with said nut and overlying said nose section of said body member whereby rotation of said sleeve member with respect to said body member effects movement of said jaws;

e) a pawl member configured and disposed such that when said jaws are desirably gripping the shank of the tool, said pawl member can be disposed to become constrained against rotation with respect to said nut and said body member so that a predetermined releasing torque must be applied before said nut can rotate with respect to said body member;

f) a nut retainer configured and disposed with respect to said body member to limit travel of said nut in the axial direction relative to said body member, said nut retainer defining an engagement portion; and g) wherein said pawl member being configured to engage said engagement portion when said jaws are desirably gripping the shank of the tool and said pawl member becomes thereby constrained against rotation with respect to said body member until a predetermined releasing torque is applied to permit said nut to rotate with respect to said body member.

wherein said sleeve member includes at least one drive rib and said nut includes at least one drive slot for receipt of said at least one drive rib whereby rotation of said sleeve member with respect to said body member effects movement of said jaws.

10. A chuck for holding the shank of a tool to be used with a manual or powered driver having a rotatable drive shaft, said chuck comprising:

a) a generally cylindrical body member having a nose section and a tail section, said tail section having an axial bore formed therein to mate with the drive shaft of the driver, said nose section having an axial bore formed therein and a plurality of angularly disposed passageways formed therethrough and intersecting said axial bore of said nose section;

b) a plurality of jaws, a separate one of said jaws being slidably positioned in one of each of said angularly disposed passageways, each of said jaws having a jaw face formed on one side thereof and threads formed on the opposite side thereof;

c) a thrust receiving portion fixed on said body member;

d) a bearing assembly disposed adjacent said thrust receiving portion;

e) a nut rotatably mounted on said bearing assembly and in engagement with said threads on said jaws;

f) a nut retainer configured and disposed with respect to said body member to limit travel of said nut in the axial direction relative to said body member, said nut retainer defining an engagement portion;

g) a generally cylindrical sleeve member configured and disposed in driving engagement with said nut and overlying said nose section of said body member;

h) wherein said sleeve member includes at least one drive rib and said nut includes at least one drive slot for receipt of said at least one drive rib whereby rotation of said sleeve member with respect to said body member effects movement of said jaws;

i) a pawl holder having at least one travel slot configured to limit relative rotational movement between said sleeve member and said pawl holder; and j) a pawl member received in said pawl holder and disposed adjacent said engagement portion of said nut retainer, said pawl member being configured and disposed such that when said jaws are desirably gripping the shank of the tool, said pawl member can be disposed to become constrained against rotation with respect to said body member so that a predetermined releasing torque must be applied before said nut can rotate with respect to said body member.

* * * * *